(12) United States Patent
Roodenburg et al.

(10) Patent No.: US 8,905,676 B2
(45) Date of Patent: Dec. 9, 2014

(54) MARINE PIPELINE INSTALLATION SYSTEM AND METHODS

(75) Inventors: Joop Roodenburg, Delft (NL); Ronny Lambertus Waltherus Nouwens, Schiedam (NL); Terence Willem August Vehmeijer, Den Haag (NL)

(73) Assignee: Itrec B.V., Schiedam (NL)

( * ) Notice: Subject to any disclaimer, the term of this patent is extended or adjusted under 35 U.S.C. 154(b) by 0 days.

(21) Appl. No.: 13/996,436

(22) PCT Filed: Dec. 12, 2011

(86) PCT No.: PCT/NL2011/050846
§ 371 (c)(1),
(2), (4) Date: Jul. 19, 2013

(87) PCT Pub. No.: WO2012/091556
PCT Pub. Date: Jul. 5, 2012

(65) Prior Publication Data
US 2013/0287498 A1    Oct. 31, 2013

Related U.S. Application Data

(60) Provisional application No. 61/427,644, filed on Dec. 28, 2010.

(51) Int. Cl.
| *F16L 1/15* | (2006.01) |
| *F16L 1/23* | (2006.01) |
| *F16L 1/19* | (2006.01) |
| *F16L 1/20* | (2006.01) |
| *F16L 1/16* | (2006.01) |

(52) U.S. Cl.
CPC . *F16L 1/19* (2013.01); *F16L 1/203* (2013.01); *F16L 1/16* (2013.01)
USPC .................. 405/168.3; 405/168.4; 405/168.1; 405/170

(58) Field of Classification Search
CPC ....................................................... B63B 35/03
USPC ......... 405/158, 166, 168.1, 168.3, 168.4, 170
See application file for complete search history.

(56) References Cited

U.S. PATENT DOCUMENTS

| 2005/0036842 A1* | 2/2005 | Stockstill .................... 405/168.3 |
| 2006/0275102 A1* | 12/2006 | Willis ......................... 414/138.4 |
| 2007/0258772 A1* | 11/2007 | Bursaux et al. ............... 405/166 |
| 2008/0118311 A1* | 5/2008 | Roodenburg et al. ......... 405/158 |
| 2009/0200036 A1* | 8/2009 | Roodenburg et al. ......... 166/358 |

FOREIGN PATENT DOCUMENTS

| GB | 2479144 A | 10/2011 |
| WO | WO 2007/108673 A1 | 9/2007 |
| WO | WO 2011/016719 A1 | 2/2011 |

* cited by examiner

*Primary Examiner* — Sean Andrish
(74) *Attorney, Agent, or Firm* — Birch, Stewart, Kolasch & Birch, LLP

(57) ABSTRACT

A marine pipeline installation system is provided for laying a pipeline and/or installing a subsea riser. The system includes a pipeline guide supported at an elevated position by the tower for guiding the pipeline from a first trajectory extending between the reel and the pipeline guide to the firing line along said tower. The pipeline guide is supported by the tower via an associated guide support frame, the support frame being adapted to allow for displacement of the pipeline guide between a pipelaying position, wherein one end of the pipeline guide is positioned in the firing line, and a retracted, non-operable position. The guide support frame allows movement of the pipeline guide in a combined upward direction and direction towards the reel, such that in the retracted position of the guide support frame the length of the first trajectory is essentially the same as in the pipelaying position.

17 Claims, 4 Drawing Sheets

MARINE PIPELINE INSTALLATION SYSTEM AND METHODS

CROSS-REFERENCE TO RELATED APPLICATIONS

This application is the National Phase of PCT/NL2011/050846 filed on Dec. 12, 2011, which claims priority under 35 U.S.C. 119(e) to U.S. Provisional Application No. 61/427,644 filed on Dec. 28, 2010, all which are hereby expressly incorporated by reference into the present application.

BACKGROUND OF THE INVENTION

The invention relates to a marine pipeline installation system for laying a pipeline and/or installing a subsea riser, said system at least being adapted to carry out the rigid reel lay method, wherein the system comprises:
one or more storage reels for storage of rigid pipeline to be installed,
a pipeline launch tower adapted for launching the pipeline in a firing line,
a pipeline guide supported at an elevated position by said tower for guiding said pipeline from a first trajectory extending between the reel and the pipeline guide to the firing line along said tower,
the pipeline guide being supported by the tower via an associated guide support frame, the support frame being adapted to allow for displacement of the pipeline guide between a pipelaying position, wherein one end of the pipeline guide is positioned in the firing line, and a retracted, non-operable position.

Such a system is known e.g. from WO2007/108673 from the same applicant. The feature that the support frame is pivotably connected to the tower allows to remove the pipeline guide from the firing line. This is in particular useful when large accessories have to be installed in the pipeline. When removing the pipeline guide from the firing line the firing line is cleared to allow accessories to enter the firing line. The clearance may e.g. be required when the accessories are to enter the firing line from above, e.g when being lowered by a crane. In WO2007/108673 the marine pipeline installation system also comprises tensioners, which are retractable from the firing line for the same reason: to clear the firing line, here to allow accessories to enter the firing line.

A disadvantage of this pivotable support frame is that when the guide is being retracted, the first trajectory is effectively shortened. As a result, the back tension of the pipeline on the reel is reduced, which is undesirable as this leads to uncoiling of the pipeline, and cause pipeline portions to be squeezed. Another disadvantage may be that pipeline that has already been straightened, is retracted and subsequently led through the straightener again. However, rigid pipes cannot be straightened twice, as this leads to pipe deterioration and may be detrimental to the pipeline's quality.

SUMMARY OF THE INVENTION

The aim of the invention was to provide an improved marine pipeline installation system. This aim is achieved by a marine pipeline installation wherein the guide support frame allows movement of the pipeline guide in a combined upward direction and direction towards the reel, such that in the retracted position of the guide support frame the length of the first trajectory is essentially the same as in the pipelaying position.

As such, the back tension of the pipeline on the reel is maintained, and respooling the pipeline onto the reel is prevented. Thus, the reel always moves in one (forward) direction, and never has to spool backwards.

This is advantageous as retraction of the support frame may be required frequently, e.g. for the installation of accessories, or when a travelling block is to be used in the marine pipeline installation system, or when the marine pipeline installation system is to be used for J-laying.

Preferably, in the retracted position of the guide support frame, a clear envelope is present around the firing line having a minimum distance to said pipeline guide of at least one meter, preferably at least 2 meters.

BRIEF DESCRIPTION OF THE DRAWINGS

Further advantageous embodiments are described in the claims and with respect to the drawings, in which.

DETAILED DESCRIPTION OF THE INVENTION

Figure 1:
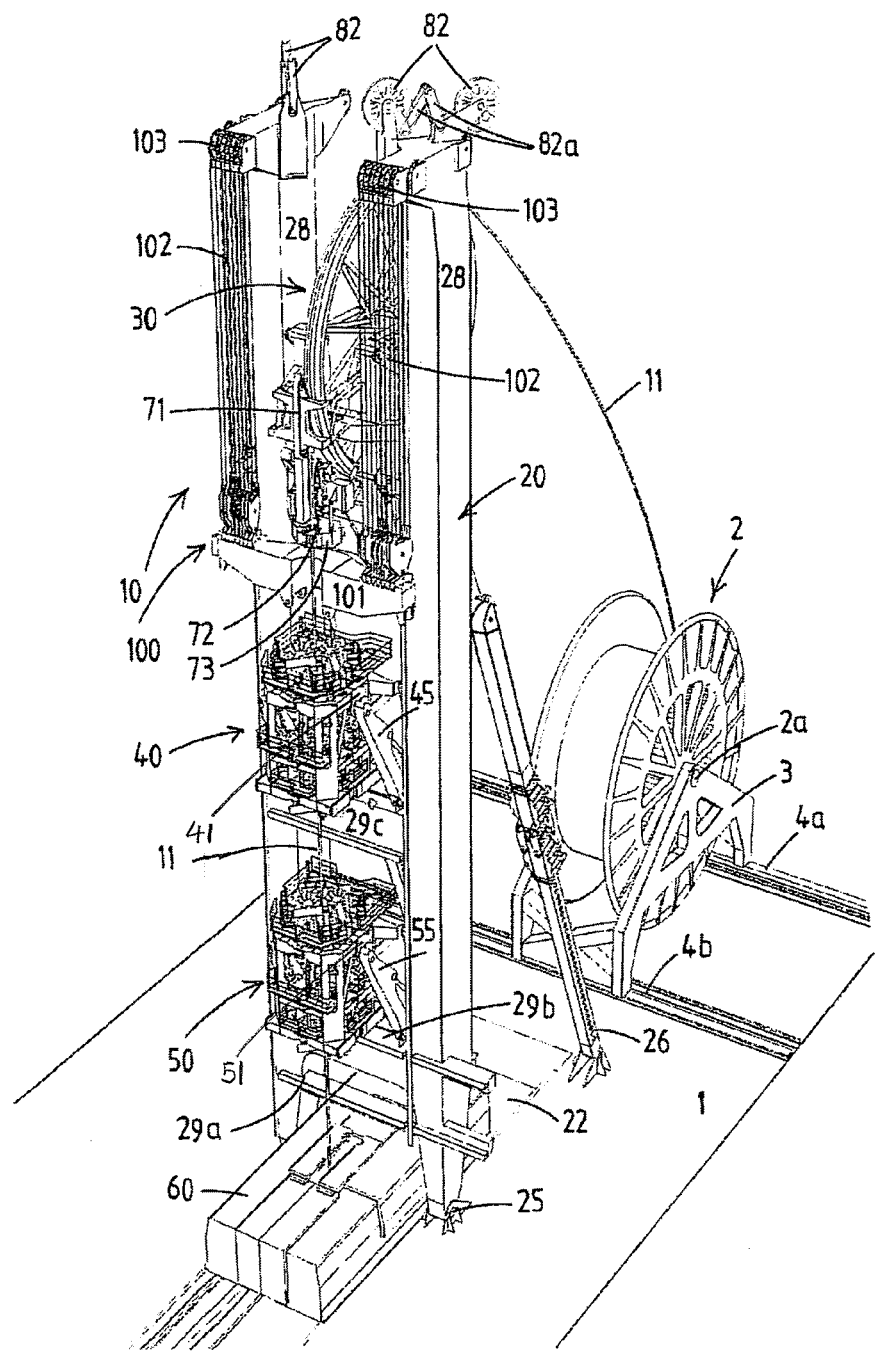
FIG. 1 shows in a perspective view a portion of a marine pipeline installation system according to the invention.
Figure 2A:
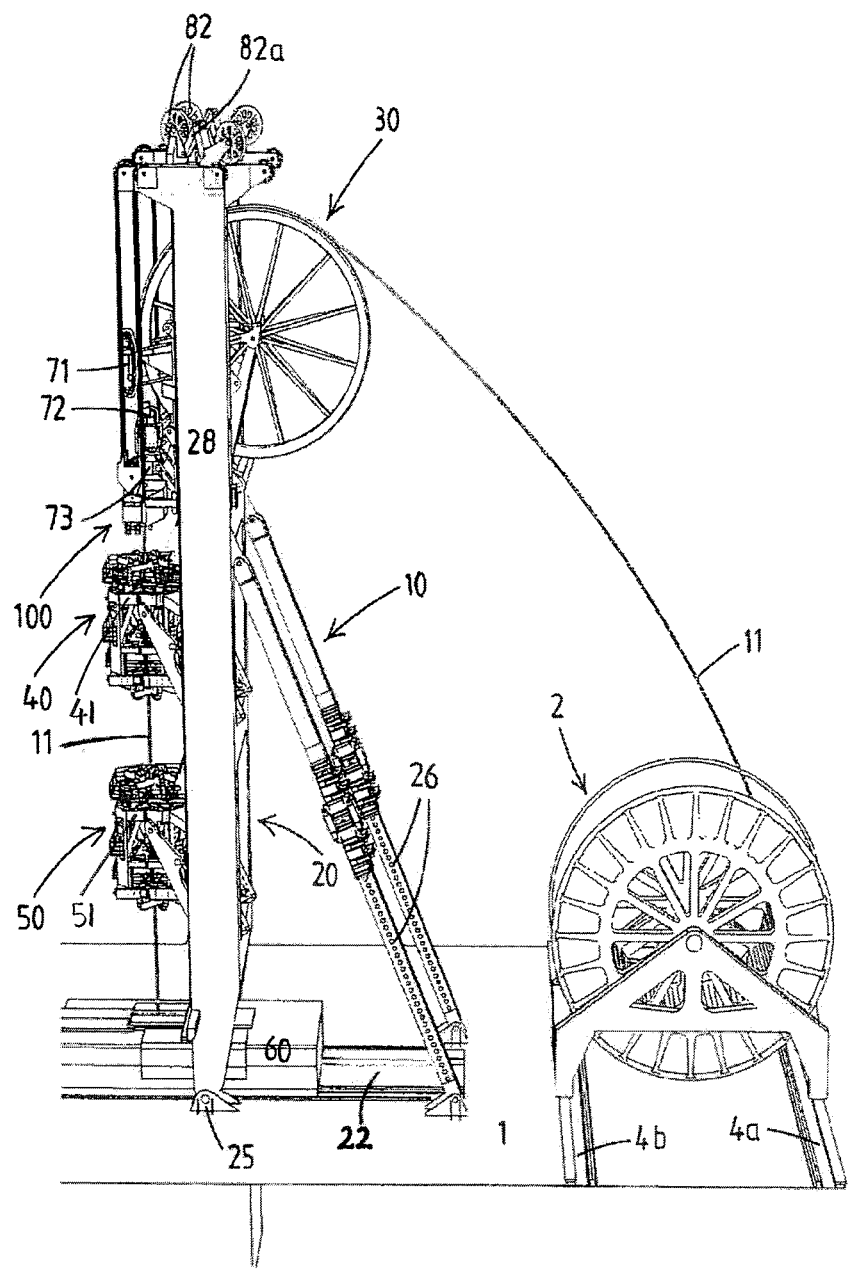
FIG. 2a shows in a side view the marine pipeline installation system of claim 1 during pipelaying.
Figure 2B:
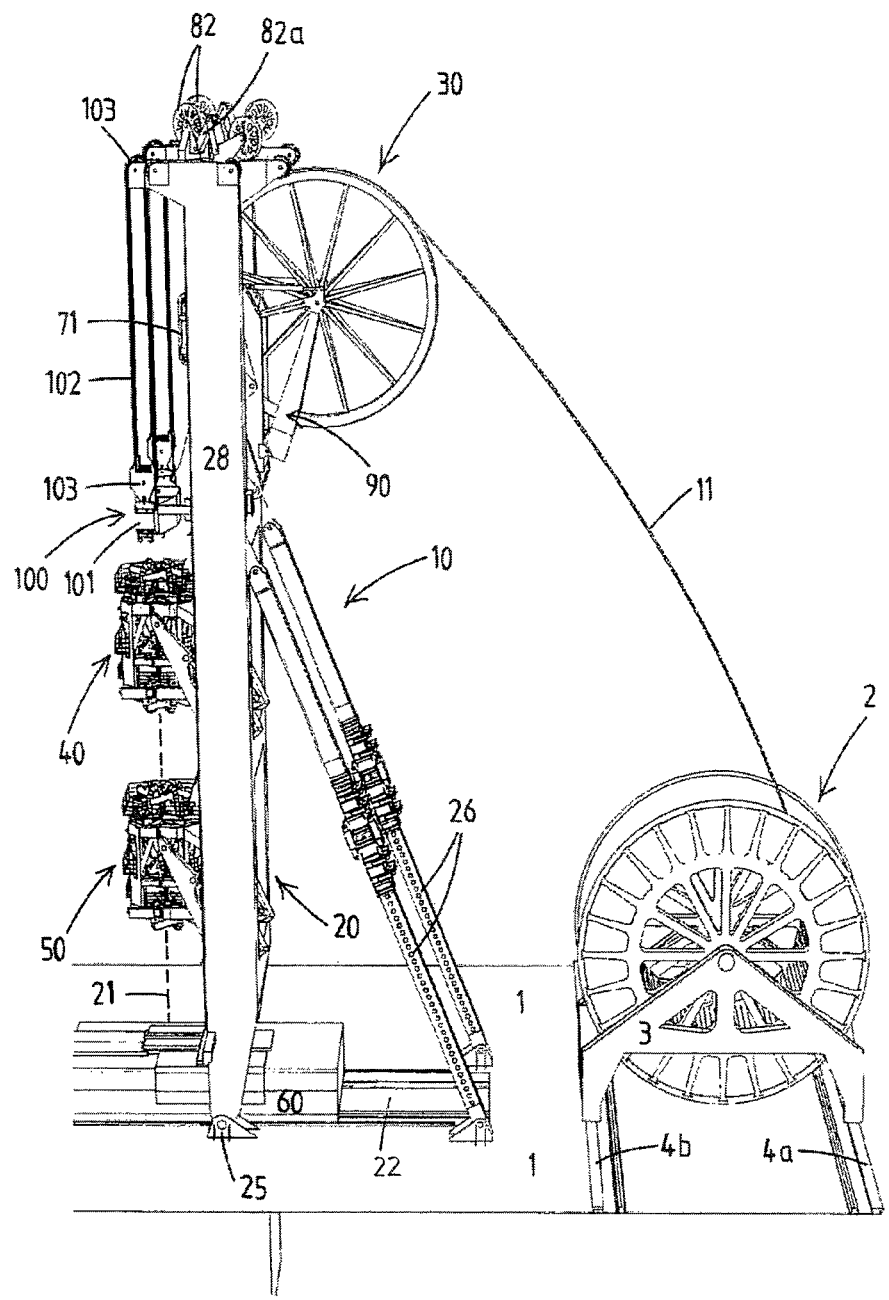
FIG. 2b shows in a side view the marine pipeline installation system of claim 1 with the support frame being moved to a retracted position.

In FIGS. 1, 2a and 2b, a marine pipeline installation system 10 is depicted, suitable for offshore pipeline installation and/or installation of a subsea riser. The system 10 is at least adapted to carry out the rigid reel lay method. Rigid pipeline is commonly a coated or non-coated steel pipeline, comprising inherent tension when spooled onto a reel.

In the shown embodiment, the installation system is provided on a deck 1 of a vessel (not shown). The vessel may be of a monohull design, but other design (e.g. as a semi-submersible vessel, as converted drilling rig, etc) are also possible.

The system 10 as shown comprises a storage reel 2 for storage of rigid pipeline 11 to be installed. It is conceivable that the system 10 comprises more than one storage reel. For example, a vessel could have one or more reels arranged (partly) within the hull of the vessel. It will be clear to the man skilled in the art that any other suitable location and embodiment of the reel(s) can be envisaged for the vessel of the invention.

In the shown embodiment, the reel 2 has a horizontal axis of rotation 2a (called a vertical reel). The reel 2 is supported by a support frame 3, which is movable along horizontal rails 4a, 4b, provided on deck 1, parallel to the axis of rotation 2a. The purpose of these rails 4a, 4b will be explained later. It is also within the scope of the invention that the reel has a vertical axis of rotation, and/or that the reel is fixed to a support, e.g. the deck of the vessel.

System 10 further comprises a pipeline launch tower 20 adapted for launching the pipeline 11 (and other objects as will be explained) in a firing line or pipeline launch trajectory 21. The firing line 21 is essentially vertical and parallel to the tower 20. Preferably, the firing line is provided adjacent the tower 20.

In the shown embodiment, a moonpool 22 is provided in said deck 1, extending through the hull. The moonpool may be located on the centreline of the vessel and about centrally in relation to the length of the vessel. Adjacent the moonpool 22, the pipeline launch tower 20 is provided, such that firing line 21 extends through said moonpool 22. Alternatively, the pipeline launch tower 20 may also be provided at the bow, stern or side of a vessel, as a result of which the pipeline is launched over the bow, stern or side into the sea.

The tower 20 here is designed as a structure arranged at one side of the moonpool 22. The tower 20 may be arranged at the aft side of the moonpool, the firing line extending along the bow or front side of the tower 20. Alternatively, the tower 20 could e.g. be arranged at the port or starboard side of the vessel, or at the bow side of the moonpool 22.

In a not-shown, non-preferred embodiment, the tower could have the form of a derrick (e.g. a latticed framework) extending over the moonpool 22, wherein the firing line 21 or pipeline launch trajectory—passes within the structure of the derrick.

In the shown embodiment, the tower 20 is supported at its lower end on the deck 1 of the vessel by a pivot structure 25 having a horizontal pivot axis, which extends preferably at right angles to the centreline of the vessel 1.

According to the shown, preferred embodiment, at least one, here two telescopic members 26 are arranged between the deck 1 and the tower 20 allow to adjust the inclination of the tower 20. In this example the inclination of the tower 20 can be varied in the range from 0 degrees to 40 degrees from vertical. When desired a smaller or broader range of tower inclination, or even a non-inclinable tower can be envisaged.

In this example the tower 20 comprises two spaced apart main vertical beams 28 interconnected by a number of horizontal crossbeams 29a, 29b, 29c.

At or near the upper end of the tower 20 a pipeline guide 30 is arranged, here embodied as a circular pipeline aligner wheel over which the pipeline is guided. As such the guide member 30 diverts the pipeline 11 from a first trajectory extending between the reel 2 and the pipeline guide 30 (here essentially in vertically upward direction) to the firing line 21. The firing line 21 here is essentially parallel to the tower 20 and the firing line 21 remains so even when the tower 20 is inclined. In an embodiment of the tower as a derrick over said moonpool the firing line would extend within said derrick. Alternatively, the pipeline guide may comprise e.g. a curved arm, or semi-circular pipe aligner.

The system may include a number of additional pipeline guide members in the first trajectory to establish a path for the pipeline between the position of the reel 2 and the pipeline guide 30 in the tower.

The purpose of the rails 4a, 4b on which the reel 2 is being provided is that the position of the reel can be adapted to the position of the guide member 30, in particular, to align the position where the pipeline leaves reel 2 with the guide member 30, to prevent sideways bending of the pipeline as much as possible.

The tower 20 is equipped in this example (as is preferred) with two pipeline tensioners, an upper tensioner 40 and a lower tensioner 50. This arrangement of two tensioners 40, 50 allows for a large number of operations to be performed (more than with a single tensioner), whereas a larger number of tensioners (although possible with the present invention) is considered to increase the complexity of the system in undesirable manner.

Tensioners are well known in the art of marine pipelaying. Commonly such tensioners include a tensioner frame and multiple, e.g. four endless tracks supported in a mobile manner in the frame to allow for variation of the gap between the tensioner to at least accommodate various pipeline diameters. Said tracks are adapted for engaging the pipeline and supporting at least part of the weight of the launched pipeline, the tensioner frame being supported by said tower via an associated tensioner support assembly. Basically any suitable tensioner can be employed in conjunction with the present inventive pipelaying system and method.

As is also common in the art the tensioner tracks here each form part of a track unit including a robust chassis, support rollers or other bearing means mounted therein for the endless track (not shown), and one more track drive/brake members (e.g. a hydraulic motor or electromotor) for effecting drive and/or braking motion of the track. Furthermore, as is a known option, the tensioner frames here are designed so that they can be opened, so that in the open state an opening is present in the side of the frame which e.g. allows to bring a pipeline sideways into the tensioner and/or remove a pipeline from said tensioner.

Tensioners 40 and 50 are of a similar design here. In the example shown here each tensioner includes a tensioner frame 41, 51, and multiple, here four, tracks supported by said tensioner frame.

As mentioned before each tensioner 40, 50 can have a high capacity for supporting pipeline load, preferably of at least 100 tonnes. In this example it is envisaged that each tensioner 40, 50 has a capacity of about 400 tons.

The frame of each tensioner 40, 50 is supported by the tower 20 via an associated support assembly. In this preferred embodiment the tensioners 40, 50 are each supported by a parallel bar linkage composed here of two sets of parallel support bars 45, 55, each set at one side of the frame. As is common the bars 45, 55 are pivoted at both their ends to the tower 20 and the frame respectively.

As can be seen in the drawings the lower ends of the bars 45, 55 are connected here to the cross-members 29c, 29b of the tower 20.

At each parallel bar assembly an actuator, here a hydraulic cylinder (not visible) is provided, to effect motion of the linkage and thus of the tensioner frame supported thereby.

Each tensioner frame (and the track units arranged therein) can be displaced with respect to the tower between an active position (FIG. 1), wherein the firing line 21 extends through the tensioner frame between the tracks, so that the tracks can engage on a pipeline 11, and a retracted and non-operable position (not shown), wherein the firing line 21 extends outside the frame of the tensioner.

In the retracted position each of the tensioners 40, 50 may be received between the opening in the tower 20 formed by the vertical beams and the horizontal beams above and below the retracted tensioner. This provides for a docking station of each tensioner in retracted position.

It will be apparent to the man skilled in the art that other support assemblies are possible for the tensioner frames. For instance a translatory support assembly is provided for the tensioner frame, e.g. including telescopic support arms or the like. Also a tilting or hinged support assembly could be provided, e.g. allowing the tilting or pivoting of the frame about a vertical or horizontal axis between an active and retracted position with respect to the tower.

Figure 3:
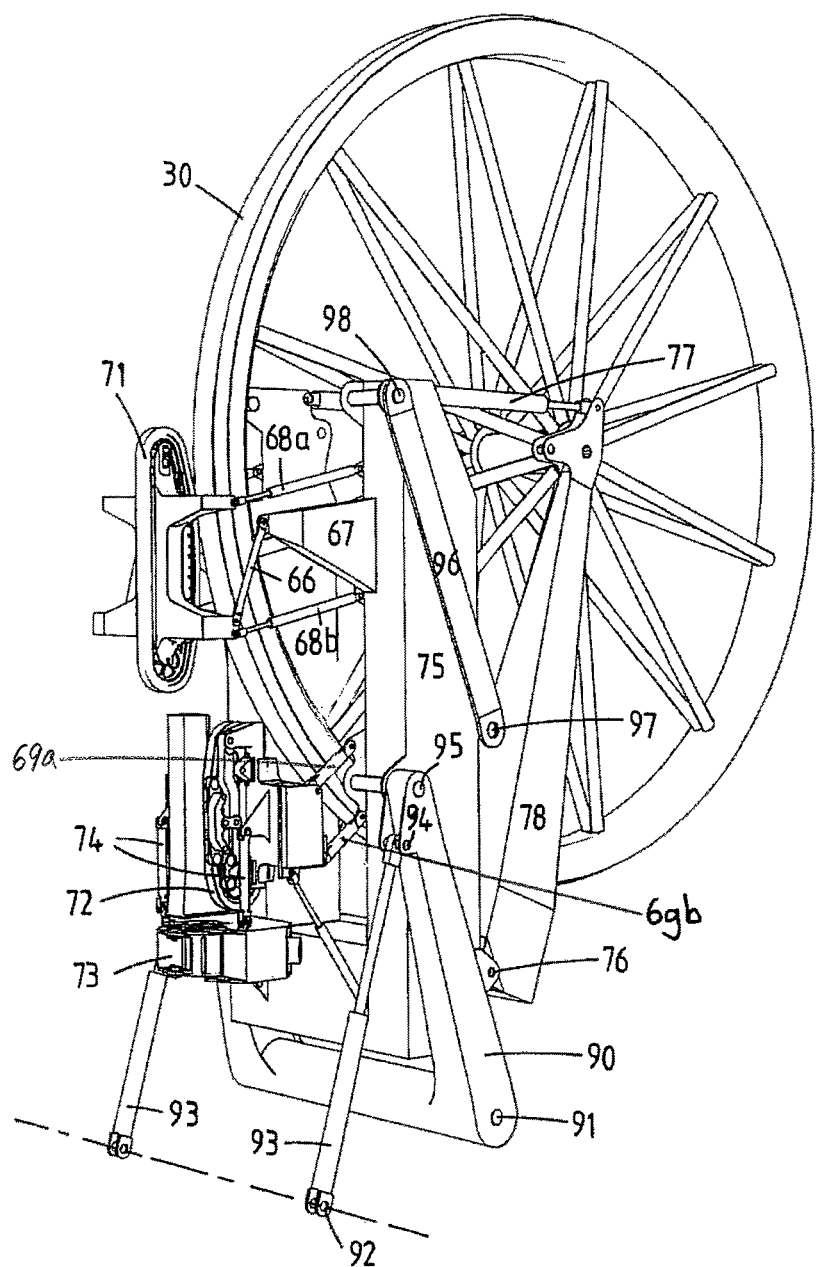
FIG. 3 shows in detail the support frame of FIG. 1.

For laying rigid pipes the shown system further includes one or more straighteners 71, 72 mounted at an elevated position on the tower, preferably between the guide member 30 and the upper tensioner 40 as is known in the art. The straighteners supported by the tower straighten the pipeline in the firing line. The straighteners 71, 72 and pipeline guide 30 are shown in more detail in FIG. 3.

A holding device, e.g a pipe clamp 73 in the shown embodiment, is preferably provided below and supported by the lowest straightener 72. This clamp is movable with respect to straightener 72 via cylinders 74, the purpose of this will be explained later.

In the shown embodiment, straighteners 71, 72 (with clamp 73) and pipeline guide 30 are supported by the tower via an associated guide support frame 75. This is visible in detail in FIG. 3.

For overload protection, the pipeline guide 30 is connected movably to this guide support frame 75 via pivot arm 78, pivot axis 76 and hydraulic cylinder 77.

To compensate for varying pipe diameters, the straighteners 71, 72 of this embodiment are also connected movably to this guide support frame 75 via pivot arm 66, frame 67, hydraulic cylinders 68a, 68b and 69a, 69b.

The guide support frame 75 is adapted to allow for displacement of the pipeline guide 30 and the one or more straighteners 71, 72 between a pipelaying position wherein one end of the pipeline guide is positioned in the firing line and wherein the firing line is adjacent the one or more straighteners, and a retracted, non-operable position.

According to a preferred embodiment of the present invention, the guide support frame 75 allows movement of the pipeline guide and the one or more straighteners in a combined upward direction and direction towards the reel, such that in the retracted position of the guide support frame the length of the first trajectory is essentially the same as in the pipelaying position. It is conceivable that the construction of the guide support frame allows a fluent combined upward movement and movement in a direction towards the reel, e.g. describing part of an arc of a circle, or part of an involute obtained from the curve of the departure point where the pipeline leaves the reel. Alternatively, a more stepwise movement is also conceivable, which will depend on the construction of the guide support frame.

In the shown embodiment, this is accomplished by the provision of a parallel bar linkage 90 provided between the tower and the guide support frame 75, in combination with two hydraulic cylinders 93 for displacing the guide support frame between the pipelaying and the retracted position.

Alternative to such a pivotable construction the guide support frame could also be adapted to be tilted or translated to displace the pipeline guide and the one or more straighteners between their pipelaying and retracted position.

Parallel bar linkage 90 is pivotably connected to the tower via pivot axis 91, and in this embodiment pivoted via hydraulic cylinders 93 which are pivotably connected to the tower via pivot axis 92, and to the parallel bar linkage 90 via pivot axis 94. Parallel bar linkage 90 is pivotably connected to guide support frame 75 via pivot axis 95, the guide support frame 75 supporting the straighteners 71, 72 and the pipeline guide 30.

In the shown embodiment, an auxiliary linkage 96 is provided to aid parallel bar linkage 90 in supporting the guide support frame 75 supporting pipeline guide 30 and straighteners 71, 72. The auxiliary linkage 96 is pivotably connected to the tower via pivot axis 97, and to the guide support frame 75 via pivot axis 98.

As a result, the construction of the parallel bar linkage 90, auxiliary linkage 96 and guide support frame 75 allows movement of the pipeline guide 30 and the straighteners 71, 72 and clamp 73 in a combined upward direction and direction towards the reel 2, such that in the retracted position of the support frame the length of the first trajectory is essentially the same as in the pipelaying position. As clamp 73 is movable with respect to straightener 72 via cylinders 74, a compensation for remaining pipe length variation is provided. As a consequence, the holding device, here clamp 73, should be capable of handling the back tension of the pipeline on the reel, which may be in the order of 100 tonnes.

As is common for marine pipelaying vessels the embodied system includes an A&R system for abandonment and retrieval of pipeline. The A&R system here includes an A&R winch for an A&R wire. This wire is guided over a number of sheaves including A&R sheaves 82. These sheaves 82 are provided at a location above said pipeline guide 30, and are arranged such that the A&R wire end can be aligned with the firing line 21 at the upper end of the tower 20. The A&R wire can thus extend along said firing line 21 downwards. The shown sheave 82 can also be retracted from the firing line by pivot mechanism 82a.

Preferably, as is this embodiment, the sheave 82 is arranged significantly above, preferably at least 4 meters, the upper tensioner 40. It is an option to provide said sheave above the lower tensioner, beneath the upper tensioner. This would have the drawback of reduction of the height of accessories to be handled by the system when the A&R system is used therefor.

As explained above, the purpose of the invention was to prevent a decrease in back tension of the pipeline 11 on the reel upon retraction of the support frame 75.

Retraction of the support frame 75 may be required upon installation of accessories, e.g. the handling of a pipeline with an integrated large object, such as a connector in a flexible pipeline. Such connectors are very large (length of e.g. 10 meters and diameter of e.g. more than 1 meter). For passing such a connector over the top of the tower 20 a major crane may be provided, e.g. positioned on deck 1. This crane is preferably dimensioned and stationed such that it allows to support the marine pipelaying operations carried out with the tower 20 when necessary. Even more preferably, the crane has a working height reaching to above the tower 20 and a reach substantially all over said deck 1.

Alternatively, or in addition, retraction of the support frame 75 may be required when a travelling clamp is used in the marine pipeline installation system. In the shown embodiment, tower 20 is provided with a travelling clamp assembly 100, suitable e.g. for J-laying. Travelling assembly 100 comprises a travelling clamp 101 and a set of travelling cables 102 and multiple cable guides 103, and a travelling cable winch (not visible). Upon retraction of the pipeline guide 30 and the straighteners 71, 72, the travelling clamp 101 is allowed to travel in the firing line, up to the upper end of the tower 20.

For the system to be able to perform J-lay operations, the system should further comprise (not shown): a pipe loader for sequentially supplying pipe sections to an elevated position aligned with the pipeline launch trajectory, a pipe section alignment device for aligning a pipe section with the upper end of the previously launched pipeline, a pipe section work station, e.g. adapted for connecting the pipe section to the launched pipeline.

In this example the moonpool 22 is covered by a movable pipe section workstation 60. For instance the workstation is slideable across rails using associated hydraulic cylinders. Workstation 60 may comprise e.g. a coating and/or NDT station.

The pipelaying system according to the invention further includes in addition to the two tensioners in the tower 20 a stationary or static pipeline support device (not visible), arranged in the firing line below the tensioners 40, 50 and workstation 60 and adapted to support—on its own—the entire weight of the launched pipeline suspending towards the seabed. Such a static pipeline support is for example required when the system is used for J-lay operations.

Said pipeline support device (not shown) can be a stationary frictional clamp, having one or more clamping elements engaging on the pipeline, said clamping elements being stationary while supporting the pipeline and not being part of a track (as in a tensioner) so that the pipeline can not be moved using said stationary frictional clamp in the direction of the pipeline axis.

It could be that the stationary pipeline support device does allow for displacement essentially in a plane at right angles to the supported pipeline, possibly while supporting the load of the pipeline. In this respect "stationary" essentially means "stationary in the direction of the pipeline".

The pipeline support device is preferably embodied as a stationary hang-off clamp which can engage on the pipeline, e.g. having one or more support element engaging below a collar on the pipeline, and support the pipeline in a stationary manner. These hang-off clamps commonly include multiple mobile clamp parts allowing the clamp to be opened for release and passage of the pipeline and closed for support of the pipeline.

Preferably said a stationary or static pipeline support device, arranged below the tensioners 40, 50 is not supported by the tower 20, but on the hull of the vessel, e.g. via a hatch over the moonpool or otherwise, e.g. a sliding static pipeline support device mounted on the hull of the vessel. It is noted that the support device could be supported by the tower if desired.

Possibly, the pipeline support device is integrated in a hatch assembly or supported thereby, and the one or more hatch panels are adapted to support the weight of the launched pipeline when held by the device. The hang-off clamp may be composed of two mating clamp parts, each integrated in a hatch panel so that the pipeline can be held between in the clamp (e.g. a pipeline collar resting on said clamp parts) when the panels are in their closed position. The hatch may also include a pipeline funnel through which a pipeline may pass when laying pipeline with the hatch panels in closed position.

The invention claimed is:

1. A marine pipeline installation system for laying a pipeline, wherein the marine pipeline installation system comprises:
   one or more storage reels for storage of rigid pipeline to be installed;
   a pipeline launch tower adapted for launching the rigid pipeline in a firing line;
   one or more tensioners supported by the pipeline launch tower, the one or more tensioners being configured to engage the pipeline and support at least part of the weight of a launched pipeline;
   a pipeline guide supported at an elevated position by said pipeline launch tower for guiding said rigid pipeline from a first trajectory extending between the one or more reels and the pipeline guide to the firing line along said pipeline launch tower; and
   a guide support frame for supporting the pipeline guide to the pipeline launch tower, the guide support frame being adapted to allow for displacement of the pipeline guide relative to the pipeline launch tower between a pipelaying position, in which one end of the pipeline guide is positioned in the firing line, and a retracted, non-operable position;
   a linkage member positioned above the one or more tensioners, and pivotably connected to the pipeline launch tower via a first pivot axis, the linkage member further being pivotably connected to the guide support frame via a second pivot axis; and
   hydraulic cylinders pivotably connected between the pipeline launch tower and the linkage member to pivot the linkage member and thereby displace the pipeline guide relative to the pipeline launch tower in a combined upward direction and a direction towards the one or more storage reels,
   wherein when the pipeline guide is in the retracted, non-operable position, a length of the first trajectory is essentially the same as the length of the first trajectory when the pipeline guide is in the pipelaying position.

2. The system according to claim 1, wherein the system further comprises one or more straighteners supported by the pipeline launch tower to straighten the pipeline in the firing line, the one or more straighteners being supported by the pipeline launch tower via the guide support frame, the guide support frame being adapted to allow for displacement of the pipeline guide and the one or more straighteners between the pipelaying position, wherein one end of the pipeline guide is positioned in the firing line and wherein the firing line is adjacent the one or more straighteners, and the retracted, non-operable position, wherein the guide support frame allows movement of the pipeline guide and the one or more straighteners in a combined upward direction and a direction towards the one or more reels, and
   wherein when the pipeline guide is in the retracted, non-operable position, the length of the first trajectory is essentially the same as that when the pipeline guide is in the pipelaying position.

3. The system according to claim 2, wherein a pipe clamp is provided below the one or more straighteners, said pipe clamp being supported by the guide support frame.

4. The system according to claim 1, wherein each of the one or more tensioners comprises a tensioner frame and multiple tracks supported by said tensioner frame, said tracks being adapted for engaging the pipeline and supporting at least part of the weight of the launched pipeline, the tensioner frame being supported by said pipeline launch tower via an associated tensioner support assembly.

5. The system according to claim 4, wherein the associated tensioner support assembly is supported by said pipeline launch tower and is adapted to allow for displacement of the tensioner frame with respect to the pipeline launch tower between an active position, in which the firing line extends through the tensioner frame between the tracks, so that the tracks can engage on a pipeline, and a retracted and non-operable position.

6. The system according to claim 1, further comprising one or more actuators for displacing the guide support frame between the pipelaying position and the retracted position.

7. The system according to claim 1, wherein the guide support frame is supported by a parallel bar linkage on the pipeline launch tower.

8. The system according to claim 1, further comprising a vessel on which said pipeline launch tower is arranged.

9. The system according to claim 8, wherein said vessel has a moonpool and the marine pipelaying system is adapted to lay pipeline through said moonpool.

10. The system according to claim 1, wherein at least one abandonment and retrieval (A&R) sheave is provided at a location above said pipeline guide.

11. The system according to claim 1, wherein the pipeline launch tower is provided with a travelling clamp assembly, comprising a travelling clamp which is allowed to travel in the firing line when the pipeline guide is in the retracted, non-operable position.

12. The system according to claim 1, wherein the pipeline launch tower is pivotable to adjust inclination of the pipeline launch tower.

13. The system according to claim 1, further comprising a J-Lay installation.

14. A method for rigid reel pipelaying, wherein use is made of a marine pipeline installation system for laying a pipeline, said marine pipeline installation system comprising:
- one or more storage reels for storage of rigid pipeline to be installed;
- a pipeline launch tower adapted for launching the rigid pipeline in a firing line;
- a pipeline guide supported at an elevated position by said pipeline launch tower for guiding said rigid pipeline from a first trajectory extending between the one or more storage reels and the pipeline guide to the firing line along said pipeline launch tower; and
- a guide support frame for supporting the pipeline guide to the pipeline launch tower, the guide support frame being adapted to allow for displacement of the pipeline guide relative to the pipeline launch tower between a pipelaying position, wherein one end of the pipeline guide is positioned in the firing line, and a retracted, non-operable position, said method comprising the steps of:
- performing rigid reel pipelaying while the guide support frame is in the pipelaying position;
- interrupting pipelaying by cutting the pipeline in the firing line, such that a pipe end connected to the rigid pipeline on the storage reel remains guided by the pipeline guide; and
- moving the guide support frame to the retracted position to move the pipeline guide relative to the pipeline launch tower in a combined upward direction and a direction towards the storage reel,
- wherein when the pipeline guide is in the retracted, non-operable position, a length of the first trajectory is essentially the same as the length of the first trajectory when the pipeline guide is in the pipelaying position.

15. The method according to claim 14, further comprising the step of using a marine pipeline installation system including one or more pipeline tensioners, each of said one or more tensioners comprising a tensioner frame and multiple tracks supported by said tensioner frame, said tracks being adapted for engaging the pipeline and supporting at least part of the weight of the launched pipeline, the tensioner frame being supported via an associated tensioner support assembly,
- wherein the tensioner support assembly of at least one of the one or more tensioners is adapted to allow for displacement of the tensioner frame with respect to the pipeline launch tower between an active position, wherein the firing line extends through the tensioner frame between the multiple tracks, so that the multiple tracks are configured to engage on a pipeline, and a retracted and non-operable position, and wherein when the guide support frame is moved to the retracted position the one or more pipeline tensioners are also moved to the retracted position to clear the firing line.

16. The method according to claim 14, wherein said system further comprises J-lay equipment, and said method further comprises the step of retracting the guide support frame to create space for effecting J-lay using said J-lay equipment.

17. The method according to claim 16, further comprising the step of installing a pipeline containing a pipeline part installed from a pipeline coming from the one or more storages reels using a reel lay method, and a further part is installed via the J-lay method wherein sections of pipeline are added sequentially to the launched pipeline, said pipeline guide being employed during reel laying in the active position of the pipeline guide, and the pipeline guide being retracted to allow for performing J-lay.

\* \* \* \* \*